US006985946B1

(12) United States Patent
Vasandani et al.

(10) Patent No.: US 6,985,946 B1
(45) Date of Patent: Jan. 10, 2006

(54) AUTHENTICATION AND AUTHORIZATION PIPELINE ARCHITECTURE FOR USE IN A WEB SERVER

(75) Inventors: Manu Vasandani, Bellevue, WA (US); Dmitry Robsman, Bellevue, WA (US); Bilal Alam, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/569,464

(22) Filed: May 12, 2000

(51) Int. Cl.
*G06F 15/173* (2006.01)

(52) U.S. Cl. ............... 709/225; 713/201; 713/202; 707/9

(58) Field of Classification Search ............ 709/225, 709/229, 227, 217, 219, 203; 713/200, 168, 713/166, 164, 161, 160, 155, 152, 151, 150, 713/202, 201; 705/1, 16, 18, 35, 39, 44; 707/1, 10, 9
See application file for complete search history.

(56) References Cited

U.S. PATENT DOCUMENTS

| | | | |
|---|---|---|---|
| 5,748,890 A * | 5/1998 | Goldberg et al. ........... 712/202 |
| 5,812,996 A | 9/1998 | Rubin et al. |
| 5,897,622 A | 4/1999 | Blinn et al. |
| 5,940,075 A | 8/1999 | Mutschler, III et al. |
| 5,953,524 A | 9/1999 | Meng et al. |
| 5,961,601 A | 10/1999 | Iyengar |
| 5,983,227 A | 11/1999 | Nazem et al. |
| 5,991,802 A | 11/1999 | Allard et al. |
| 6,014,666 A * | 1/2000 | Helland et al. ........... 707/9 |
| 6,032,207 A | 2/2000 | Wilson |
| 6,076,108 A | 6/2000 | Courts et al. |
| 6,108,717 A | 7/2000 | Kimura et al. |
| 6,178,461 B1 | 1/2001 | Chan et al. |
| 6,185,608 B1 | 2/2001 | Hon et al. |
| 6,205,480 B1 * | 3/2001 | Broadhurst et al. ......... 709/225 |
| 6,212,192 B1 | 4/2001 | Mirashrafi et al. |
| 6,230,160 B1 | 5/2001 | Chan et al. |
| 6,247,044 B1 | 6/2001 | Gosling et al. |
| 6,253,228 B1 | 6/2001 | Ferris et al. |
| 6,351,767 B1 | 2/2002 | Batchelder et al. |

(Continued)

FOREIGN PATENT DOCUMENTS

WO      WO 98/21651      5/1998

(Continued)

OTHER PUBLICATIONS

Wu, Dapeng; Hou, Yiwei Thomas; Zhang, Ya-Qin; "Scalable Video Transport over Wireless IP Networks"; IEEE 2000; pp. 1185-1191.

(Continued)

*Primary Examiner*—Wen-Tai Lin
(74) *Attorney, Agent, or Firm*—Microsoft Corporation (57) ABSTRACT

A method, system, and article of manufacture for providing an authentication and authorization pipeline for use in a web server to grant access to web resources to users. The server creates an entry within an userID to roles database for each user who may access resources present on the web server and creates an entry within the roles to resource database for each resource that may be accessed on the web server. The server then authenticates the identify of each user accessing a resource on the web server using a userID, one or more authentication parameters, and a resource access request, creates a data object having an authenticated userID and one or more roles corresponding to the authenticated userID obtained from the userID to roles database, and authorizes access to a resource identified within the resource access request if one or more roles within the data object correspond to an access role corresponding to the roles listed within the roles to resource database for the identified resource.

35 Claims, 9 Drawing Sheets

U.S. PATENT DOCUMENTS

| | | | |
|---|---|---|---|
| 6,370,561 B1 | 4/2002 | Allard et al. | |
| 6,373,841 B1 | 4/2002 | Goh et al. | |
| 6,397,253 B1 | 5/2002 | Quinlan et al. | |
| 6,405,241 B2 | 6/2002 | Gosling et al. | |
| 6,460,141 B1 * | 10/2002 | Olden | 713/201 |
| 6,480,894 B1 | 11/2002 | Courts et al. | |
| 6,487,665 B1 * | 11/2002 | Andrews et al. | 713/201 |
| 6,557,038 B1 | 4/2003 | Becker et al. | |
| 6,622,168 B1 | 9/2003 | Datta | |
| 6,728,884 B1 * | 4/2004 | Lim | 713/201 |
| 6,816,891 B1 * | 11/2004 | Vahalia et al. | 709/214 |
| 2001/0054020 A1 | 12/2001 | Barth et al | |
| 2002/0008703 A1 | 1/2002 | Merrill et al | |
| 2003/0009519 A1 | 1/2003 | Gosling | |
| 2003/0009567 A1 | 1/2003 | Farouk | |
| 2003/0018827 A1 | 1/2003 | Gutherie et al. | |
| 2003/0025728 A1 | 2/2003 | Ebbo et al | |
| 2003/0028565 A1 | 2/2003 | Landsman et al | |
| 2003/0074634 A1 | 4/2003 | Emmelmann | |

FOREIGN PATENT DOCUMENTS

| | | |
|---|---|---|
| WO | WO 98/44695 | 10/1998 |
| WO | WO 99/34288 | 7/1999 |

OTHER PUBLICATIONS

Dobson, Rick; "Data Binding in Dynamic HTML"; DBMS Mar. 1998, pp. 47-52.
Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.
Esposito, Dino; "Heaven Sent"; Developer Network Journal issue Mar./Apr. 23, 2001 pp. 18-24.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May), 1999, pp 109-111.
Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.
"OOP Launches Hammock at JavaOne" http://www.oop.com/pr2000_06_08.jsp?gui=Plain Jun. 8, 2000, 1 page.
"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Duan, Nick N.; "Distributed Database Access in a Corporate Environment Using Java" Bell Atlantic Corporation; 1996, 8 pages.
Nadamoto, Akiyo; Kondo, Hiroyuki; Tanaka, Katsumi; "WebCarousel: Restructured Web Search Results for Passive Viewing in Mobile Environments" IEEE 2001 p. 164-165.
Developing ASP-Based Applications: Microsoft 1996, 5 pages.
"ColdFusion: Web Application Server"; Allair Corp; www.allair.com; 1995-1999; 28 pages.
"Alterego Networks Introduces First Mobile Web Server for Enterprises, Telcos and Providers"; Redwood City, CA: Nov. 14, 2000; 3 pages.
"Bluestone Software Layes Foundation for Internet Operating Environment with Total-E-Server . . . " Screaming Media, Business Wire; Jun. 5, 2000; 3 pages.
Stewart, Tony; "The Document as Application: Issues and Implications" GCA XML Europe 1999; pp. 575-599.
Franklin, Keith; "Supercharge Data Binding"; Visual Basic Programmer's Journal, Mar. 2000; 7 pages.
Shapiro, Marc; "A Binding Protocol for Distributed Shared Objects" Presented at 14th International Conference on Distributed Comp. Sys.; Jun. 21-24, 1994; 17 pages.
"Best Practies for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
Marshall, James; "HTTP Made Really Easy: A Practical Guide to Writing Clients and Servers"; Aug. 15, 1997; 14 pages.
Chapter 3, "Mechanics of Developing JavaScript Applications"; Server-Side Javascript Guide; Online! 1999; pp 51-108 www.developer.netscape.com/docs/mauals/ssjs/1_4/ssjs.pdf.
Chapter 6, "Session Mangement Service"; Server Side Javascript Guide; Online? 1999 pp 125-166 www.developer.netscape.com/docs/manuals/ssjs/1_4/ssjs.pdf.
Anderson, Richard; Homer, Alex; Howard, Rob; Sussman, Dave; "A Preview of Active Server Pages+"; Copyright 2000, Wrox Press, pp. 1-73.
"HTML Encyclopaedia"; http://www.scit.wlv.ac.uk/encyc/form.html; 1995-1998 2 pages.
"A Brief History of Hypertext" Microsoft Corporation, 1996, 1 page.
Frost, Jim; "Windows NT Security"; May 4, 1995; 7 pages; http://world.std.com/jimf/papers/nt-security/nt-security.html.
Davulcu, Hasan; Freire, Juliana; Kifer, Michael; Ramakrishnan, I.V.; "A Layered Architecture for Querying Dynamic Web Dynamic Web Content"; ACM 1999; pp. 491-502.
Kitayama, Fumihiko; Hirose, Shin-Ichi: Kondoh, Goh; Kuse, Kazushi; "Design of a Framework for Dynamic Content Adaptation to Web-Enabled Terminals and Enterprise Applications"; IEEE 1999, pp. 72-79.
European Search Report 01111678.7-2201, Mar. 27, 2002.
European Search Report 01111680.3-2201, Mar. 20, 2002.
European Search Report 01111681.1-2201, Mar. 19, 2002.
European Search Report 01111682.9-2201, Mar. 25, 2002.
Solomon, David A. "Inside Windows NT, Second Edition"; Microsoft Press 1998; pp. 310-319.
Custer, Helen; "Inside Windows NT"; Microsoft Press 1993; pp. 74-81.

* cited by examiner

```
// The IIdentity object is typically generated by the authentication
module
Interface IIdentity
{
      String     Name; // name of the person/user represented by this
identity. Eg. "John_Doe"
}

// The IUser object is typically generated by the authentication module
Interface IUser
{
      IIdentity  Identity; // Identity of the user
      BOOL       IsMember (String roleName); // This function checks if
the user is a member of role "roleName"
}

*
*
*

// In the authorization module, or elsewhere in the code, an
authorization check similar to this can be made:

if (amount > 10,000 && user.IsMember("Managers") == FALSE)
{
      generate_error("The user must be at least a manager to authorize
payments of more than $10,000");
      return;
}
```

AUTHENTICATION AND AUTHORIZATION PIPELINE ARCHITECTURE FOR USE IN A WEB SERVER

TECHNICAL FIELD

This invention relates in general to a method, apparatus, and article of manufacture for providing access security within a networked computing system, and more particularly to a method, apparatus, and article of manufacture for providing a pipelined software architecture containing authentication and authorization modules for use in a web server.

BACKGROUND

Over the last several years, the use of the internet by individuals and business entities has increased significantly as the internet has become established as a mechanism to disseminate information. The internet presents information to a user using a web browser that is located on his or her computer. The web browser retrieves and displays web pages from various web servers connected to the internet. This widespread use of the internet has given rise to applications in which access to resources such as data, web pages, functional software operations, and the like needs to be limited to a small set of known and authorized users.

As the variety of web based applications increases, the number of different mechanisms used to authenticate the identity of a user who is attempting to access web resources has increased. These mechanisms differ in their complexity as each mechanism attempts to provide a particular level of assurance of the identity of the requesting user. This level of assurance is typically balanced against the computational cost and complexity to reach a given level of assurance. For example, when accessing banking records over the internet, a bank customer may be willing to accept a lower level of assurance to see personal banking data such as address and recent transaction history in exchange for the speed, cost, and reduced complexity needed to access the data. However, the customer and the bank may not be willing to accept the lower level of assurance for the identity of a user when the request being processed involves transferring finds from the user's account. Because it is expected that inspecting data is a more frequent occurrence than transferring finds, the above cost-benefit tradeoff may be reasonable.

Secondly, the authentication mechanisms sometimes differ because they provide services in differing software environments. For example, an authentication mechanism suited for use within a corporation, may be unsuitable on the Internet. One reason for this could be, that you would expect everyone in your corporation to use the same client (Internet browser). On the other hand, on the Internet, you would expect users to use different clients to access resources on your web-server.

The increased use of the internet to provide users access to data and processing resources has also given rise to a widely distributed computing environment. This computing environment may be characterized as having a multitude of accessible resources connected to a widely available communications network. These accessible resources are typically set up and maintained as independent processing systems that each possess an individual set of parameters used to characterize and describe the users who may access the available resource. A single user may access resources available on a first server within the capacity of a customer of a bank. This user may access other resources on a server as an employee of a corporation. This user may access another set of resources on the web as a trusted party. In each of these transactions, the same user will typically be given different access privileges to the corresponding resources according to the "role" the user has with respect to each resource. The definition of these roles and the relationship between the roles and individual users are specified by each server for each resource made available to users.

Currently, the authentication of users is typically implemented with a userID and a password. After authentication of a userID, access to resources may be granted based upon whether the userID is permitted access. The use of roles to group collection of userIDs into groups of users having identical access has occurred. However, the use of these roles has always been part of a process that combines the authentication of userIDs, to obtain the roles, with the authorization of access to the resources using the roles. This combination of the authentication operations with the access authorization operation prevents the easy use of different authentication functions within a single system to obtain differing levels of assurance for resources commonly located within a single system. Secondly, due to various reasons, the web server may have to support more than one authentication schemes. Eg. All web server clients ("Internet browsers") may not support a particular functionality, which prevent using some authentication schemes. To make sure that users using different Internet browsers are able to communicate with the web server, the web server may want to support more than one authentication scheme. If different authentication functions are to exist within a single system as described above, then the role based access authorization functions typically have been reproduced with separate role-based systems for each corresponding authentication system. This duplication of functionality is unnecessary and adds additional complexity to the web server implementation.

SUMMARY

The present invention solves the above-described problems by providing a method, apparatus, and article of manufacture for providing access security within a networked computing system. This invention solves these problems by separating the authentication operations needed to determine if a server knows who the user is to a desired level of assurance from the authorization operations needed to determine if a known user is entitled to access a requested resource. These two sets of operations communicate using a data object defined to pass the necessary data between these sets of operations. By using this standard data object, a server may readily substitute any implementation of the authentication operations that provided the desired level of assurance needed by the server without affecting the authorization functions. Similarly, the use of this data object allows a server to use any implementation of the authorization operations for a specific set of user roles without affecting any authentication operations.

A system in accordance with the principles of the present invention includes a method for providing an authentication and authorization pipeline having a userID-roles database and a resource-roles database for use in a web server to grant access to web resources to users. The method creates an entry within the userID-roles database for each user who may access resources present on the web server and creates an entry within the roles-resource database for each resource that may be accessed on the web server. The method then authenticates the identify of each user accessing a resource on the web server using a userID, one or more authentication parameters, and a resource access request, creates a data object having an authenticated userID and one or more roles corresponding to the authenticated userID obtained from the userID-roles database, and authorizes access to a resource identified within the resource access request if one or more roles within the data object correspond to an access role corresponding to the roles listed within the roles-resource database for the identified resource.

Other embodiments of a system in accordance with the principles of the invention may include alternative or optional additional aspects. One such aspect of the present invention is that a computer data signal embodied in a computer propagated carrier wave readable by a computing system and encoding a set of computer instructions for providing an authentication and authorization pipeline having a userID-roles database and a resource-roles database for use in a web server to grant access to web resources to users.

Another such aspect is a computer-readable medium having stored thereon a data structure a set of computer instructions for providing an authentication and authorization pipeline having a userID-roles database and a resource-roles database for use in a web server to grant access to web resources to users.

Yet another such aspect is a system for providing an authentication and authorization pipeline having a userID-roles database and a resource-roles database for use in a web server to grant access to web resources to users. The system has an authentication module for verifying the identity of the user sending the resource access request server using a userID, one or more authentication parameters, and a resource access request. The system also has an authorization module for determining whether the user is granted access to the requested resource and one or more resources provided by the server to users communicating over a communications network. The authentication module creates a data object having an authenticated userID and one or more roles corresponding to the authenticated userID obtained from the userID-roles database and passes the data object to the authorization module for use in determining whether to grant access to the resource.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus, and article of manufacture for providing an authentication and authorization pipeline for use in a web server.

Figure 1:
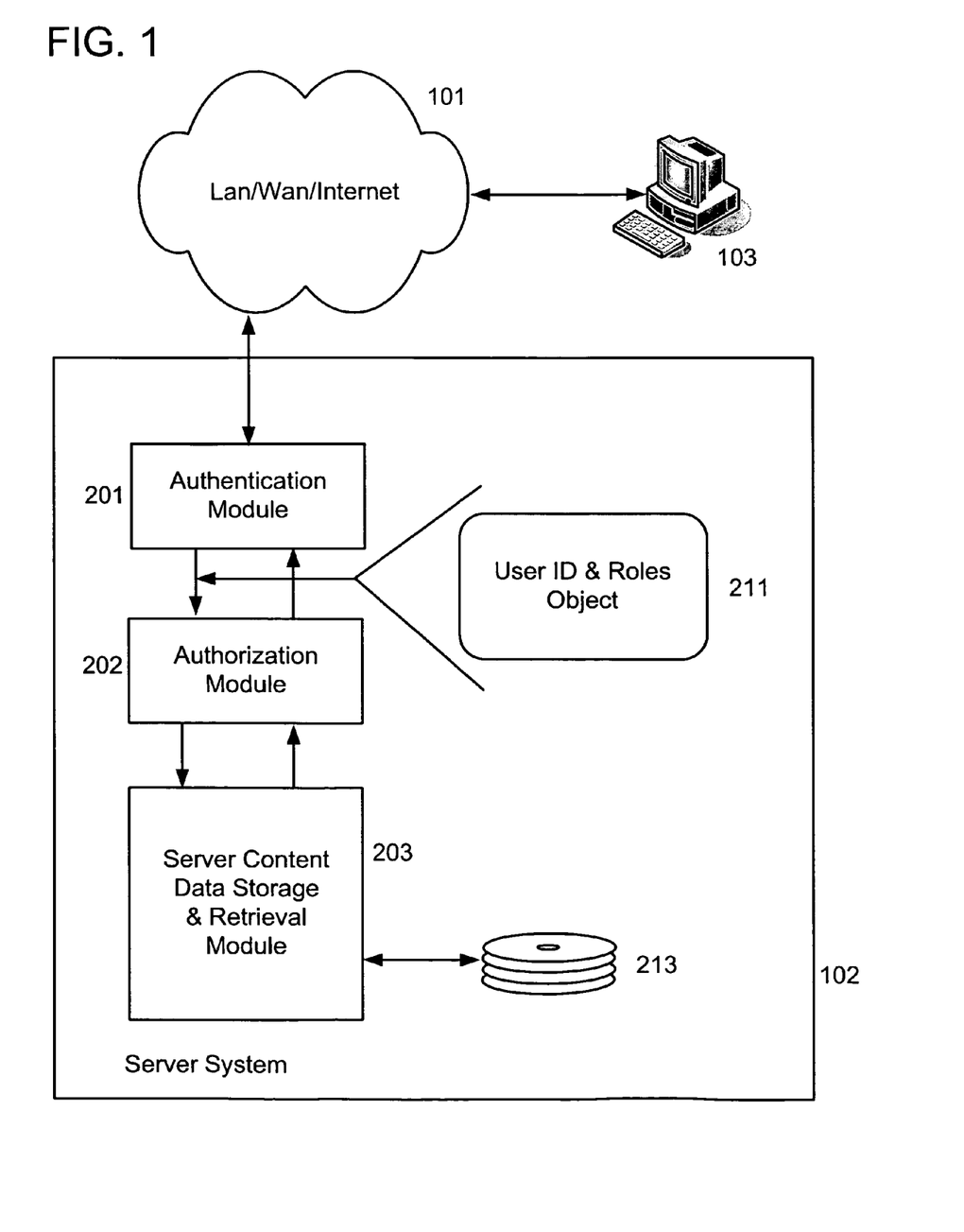
FIG. 1 illustrates a web server system used to provide an authentication and authorization pipeline for use in a web server according to an example embodiment of the present invention.

FIG. 1 illustrates a web server system used to provide an authentication and authorization pipeline for use in a web server according to an exemplary embodiment of the present invention. The server computer 102 receives requests for service in the form of a request for a web page from a client computer 103 over a communications network 101. The request is received by the server computer 102 at which time a response is generated and returned to the client computer 103.

This response is typically a web page. The web page could be a static web page, or it could be dynamically generated by the web server (generated "on-the-fly"). In either case, the web server would probably need to access resources on the web server, such as files on mass storage 213.

Before the access of the web page is provided, the web server 102 needs to determine if access to the web page should be granted. This determination requires two separate factual issues to be resolved. First, the web server 102 needs to determine if it knows who the user 103 is within the universe of all web users. If the user is known (which typically is determined when the userID is provided to the server with a sufficient level of comfort for the web server to believe that the user providing the userID is the correct individual), the server must also determine if the particular user ID provided is permitted to access the web page being sought.

According to one embodiment, a web server 102 is constructed with a processing pipeline having a series of interconnected processing modules. These processing modules include an authentication module 201, an authorization module 202, and a server content data storage and retrieval module 203. The authentication module 201 performs the operations necessary to verify the identity of the user 103 to a desired level of assurance. The authentication module 201 will generate a data object 211 that contains data relating the known identity of the user along with roles data used to control the authorization of groups of users to the available resources. The authorization module 202 is a separate module that receives a userID-roles object 211 from the authentication module 201. With the userID-roles object as one of the parameters, the authorization module 202 determines whether the request for a resource should be granted based upon the userID-roles object 211.

The server content data storage and retrieval module 203 processes the resource request to generate a response. In one embodiment, this module 203 is generating a web page having a particular set of content data that may be provided only to a small number of users. This web page may be a static page of data represented by an HTML page specification located on the server. This web page may also be a dynamically generated page of data that is created by an invocation of a software-based function within the server in the form of an HTML page specification. In alternate embodiments, these responses may be accessed to generic data files located upon the server as well as executing other functions on the server 102 without deviating from the spirit and scope of the present invention.

Figure 2:
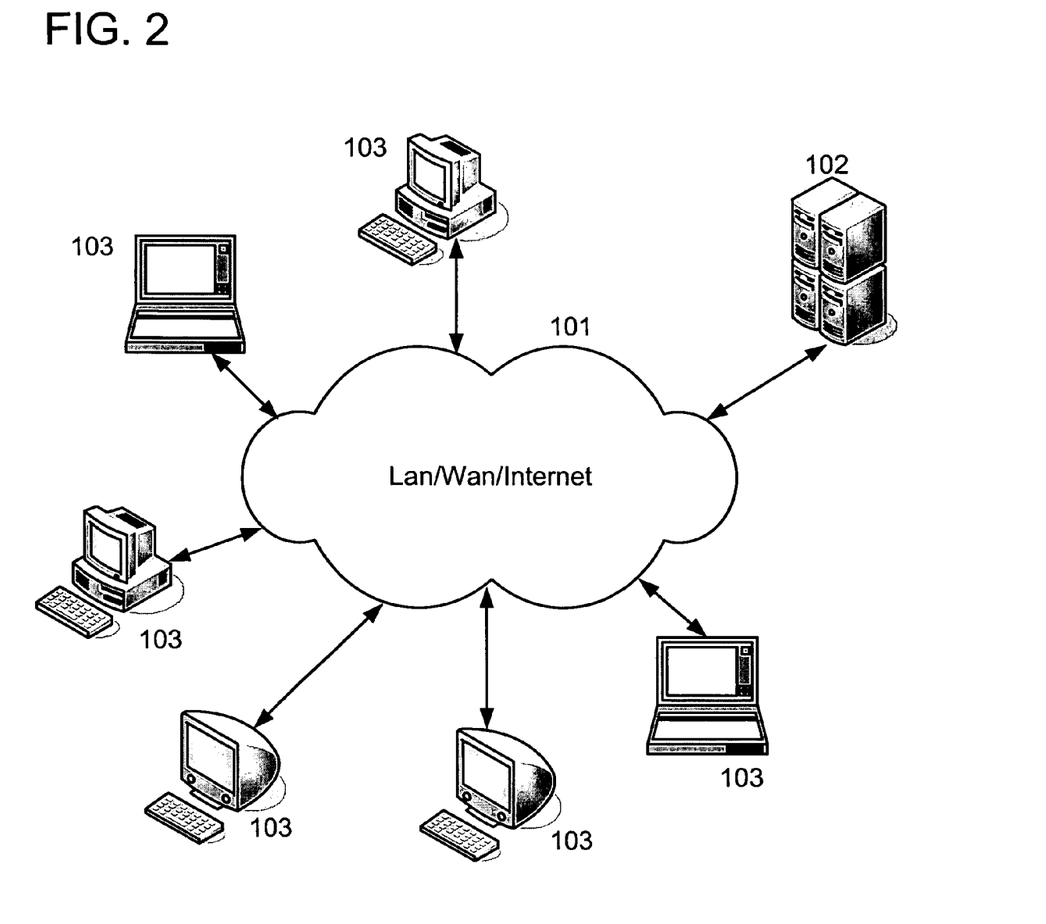
FIG. 2 illustrates a one possible organization for a distributed computing system utilizing one possible embodiment of the present invention.

FIG. 2 illustrates one possible organization for a distributed computing system utilizing one possible embodiment of the present invention. The distributed computing system includes a plurality of computing systems connected together using a communications network. These computing systems include user workstations and laptop computers 103 directly connected to a wide area network (WAN) 101. Also connected to the WAN 101 is a plurality of server computers 102. In one possible embodiment of the present invention, the WAN 101 may be the Internet in which user computers 103 connect using a typical dial-up connection through an internet service provider (ISP).

The server computers 102 receive these service requests from the user client computers 103 and generate the appropriate responses. In the preferred embodiment, this communications is utilizing the standard http communications protocol. The responses generated and returned to the user client computers 103 is typically in the form of a web page specified in HTML that may be displayed to the user utilizing a web browser such as MICROSOFT INTERNET EXPLORER or NETSCAPE NAVIGATOR.

Figure 3:
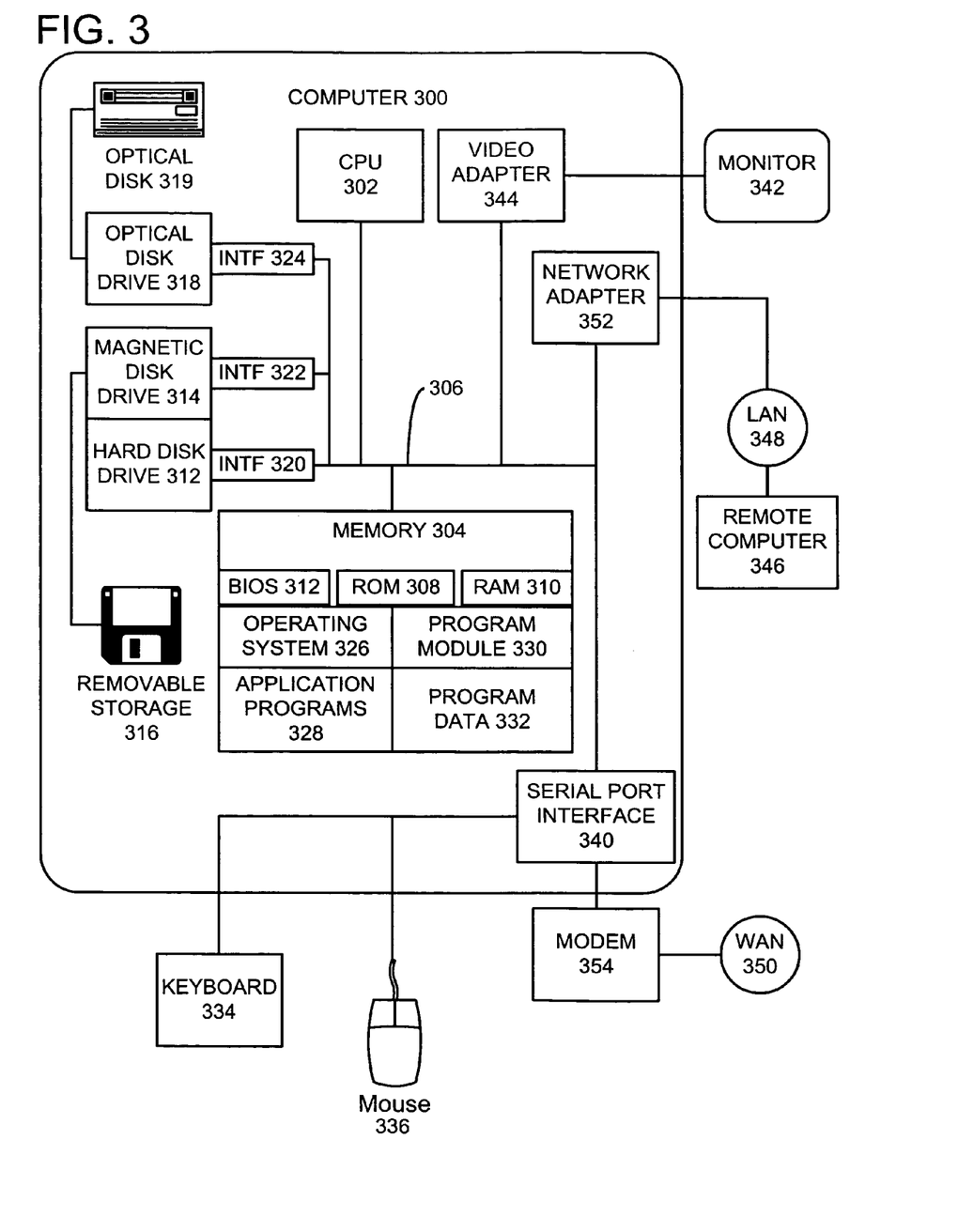
FIG. 3 illustrates a computing system that may be used as the server computing system according to one embodiment of the present invention.

FIG. 3 illustrates a computing system that may be used as the server computing system according to one embodiment of the present invention. An exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communications link between the computers may be used.

The embodiments of the invention described herein are implemented as logical operations in a telecommunications system having connections to a distributed network such as the Internet. The logical operations are implemented (1) as a sequence of computer implemented steps running on a computer system and (2) as interconnected machine modules running within the computing system. The implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

Figure 4:
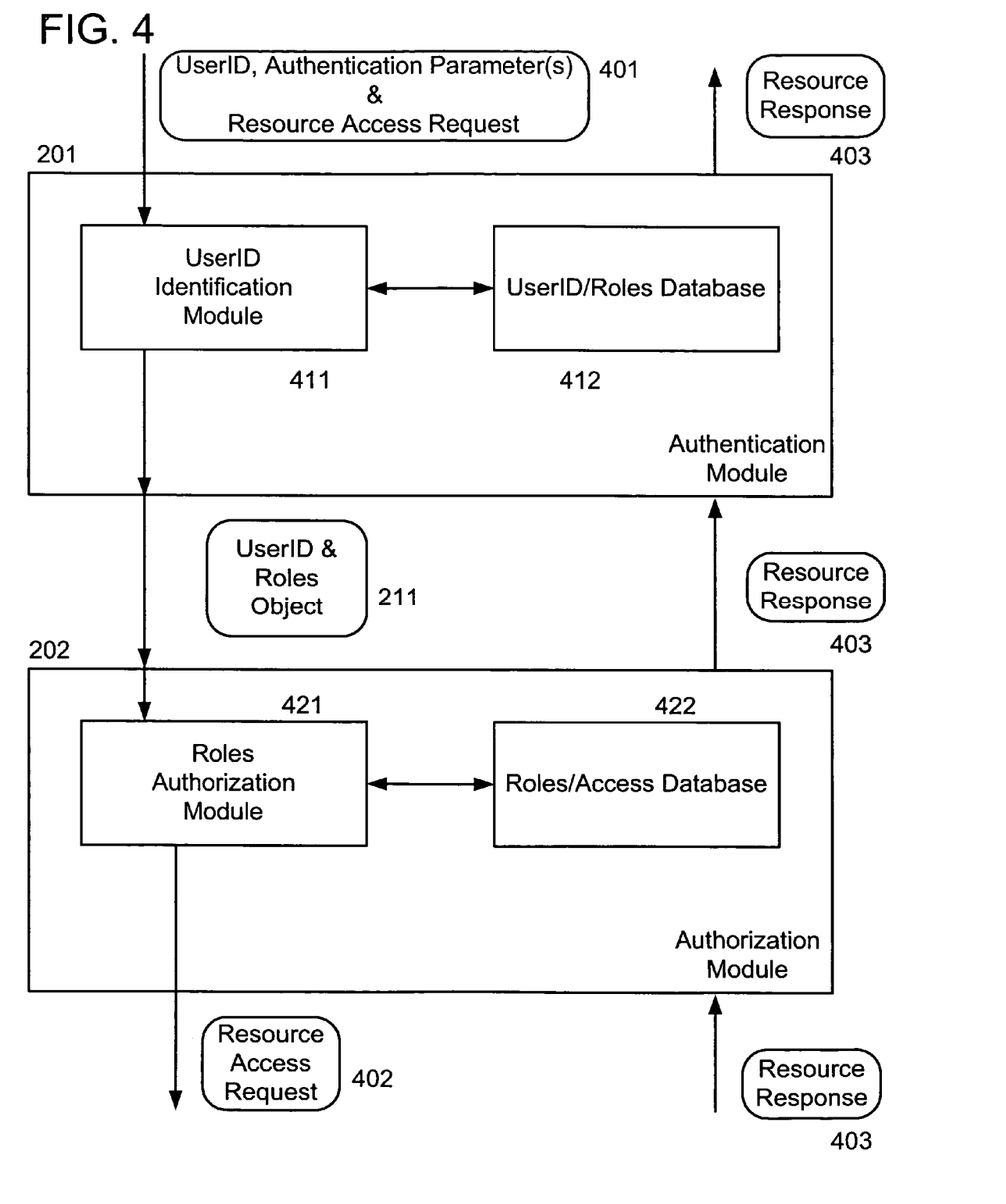
FIG. 4 illustrates a web server system used to provide an authentication and authorization pipeline for use in a web server according to another possible embodiment of the present invention.

FIG. 4 illustrates a web server system used to provide an authentication and authorization pipeline for use in a web server according to another embodiment of the present invention. The overall architecture for the server response system is a pipeline structure in which a request for service flows down through the pipeline. A response to the request is generated by at least one module in the pipeline and passed back to the requesting entity through the pipeline.

A request for a service 401 is typically transmitted from a remote computer 103 to the server 102 and received initially by an authentication module 201. Within the authentication module 201, a userID identification module is used to process the request for service 401. The request for service 401 has a userID, one or more authentication parameters and a resource access request. The user ID is a unique identifier for the identity of the user requesting access to the resource. The authentication parameters are additional data values used by the userID identification module 411 to verify the identity of the user. In one embodiment, these parameters may be simply a password. In other embodiments, these parameters may include additional data items such as signed identity certificates that are encrypted with a digital signature which may be used to verify that the certificate is from a trusted source. These parameters may also include some other unique information regarding the source of the data that may be used to verify the identity of the requester.

The userID identification module 411 processes the request, the userID and the authentication parameters to determine if the user is a known user. This module 411 interacts with a userID-Roles database 412 as part of this processing to identify the particular access roles that the identified userID may use. This module 411 uses all of this processed and retrieved data to generate a userID-Roles object 211 if the userID is successfully authenticated. The module 201 will generate an error response and transmit the response 403 back to the requesting user 103 if the userID is not authenticated.

The authorization module 202 receives the userID-Roles object 211 and processes it within a roles authorization module 421. Access to the requested resource is granted if the authenticated userID possesses one or more roles which is granted access to the resource. The roles authorization module 421 implements a binary decision to grant or deny access based upon this role access decision. The module 421 will access a roles access database 422 to determine if the roles listed in the userID-Roles object corresponding to the authenticated userID are among the roles permitted access to the particular resource. A resource is typically identified by a Universal Resource Identifier (URI) which provides a unique identifier for each resource. The Roles-resource database 422 has an entry for each URI on the server with a listing of all of the roles which may gain access to the resource. The roles authorization module 421 retrieves the database entry for the requested resource using the URI and attempts to match a role from the userID-Roles object with the roles in the database entry. If no match is found, an authorization error is generated and transmitted as a response 403 to the authentication Module 201 for transmission to the requesting user 103. If a match is found, the resource access request 402 is sent to the resource for processing. The resource will generate and transmit a response 403 through both the authorization and authentication modules 201, 202 back to the user 103 (see FIG. 1).

Through the use of separate authorization and authentication modules that communicate using a data object as described herein, one or more of these modules may be replaced with different authentication and authorization modules. These different modules may include third party modules, enhoused and extended modules, and custom developed modules that provide a desired level of security for the server. As long as these different modules utilize the data object and its corresponding interface, these modules may be replaced without affecting the functionality and operation of any other component in the system.

Figure 5:
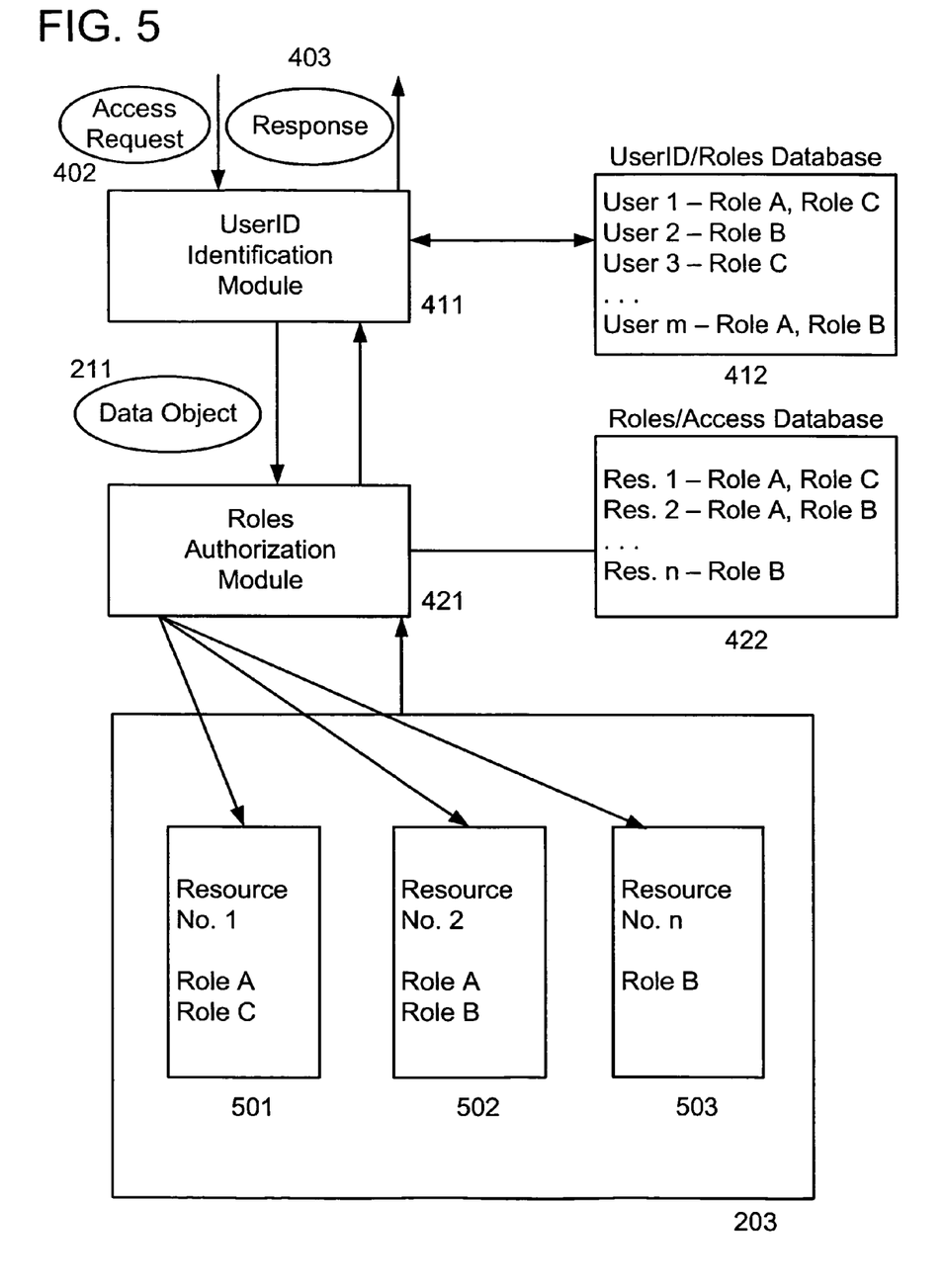
FIG. 5 illustrates an authentication module and authorization module within an output pipeline for use in a web server according to yet another possible embodiment of the present invention.

FIG. 5 illustrates an authentication module and authorization module within an output pipeline for use in a web server according to yet another embodiment of the present invention. Consider the example of a request for access 402 to a resource named "Resource No. 2" by a user 103 having a user ID of "User 1". For the purposes of these examples, it is assumed that the users all provide a password that correctly matches the expected password for the corresponding userID. Of course, if this match does not occur, the UserID Authentication Module 411 will generate an error and processing will cease.

The userID identification module 411 will receive the request for User 1 and retrieve the database entry indicating roles "A" and "C". Using this data, a userID-Roles object 211 will be created with the userID of "User 1" and roles of "A & C". Object 211 is passed to the roles authorization module 421 along with the access request for Resource No. 2 502. Authorization module 421 will look up the roles for Res. 2 and find roles "A and B." These roles are compared by module 421 with the roles from the object, "A & C." The roles authorization module 421 finds that role "A" is present in both lists. As a result, the request 402 (See FIG. 4) will be sent to Resource 2 502 for processing. A response 403 will be generated by resource 2 502 and transmitted back up the pipeline to the user 103.

Now consider an example in which User 2 sends a request for access to Resource No. 1. The processing within the UserID Identification module 411 will proceed as above with the generation of an userID-Roles object 211 having User 2 and Role B along with the request to access to Res. 1. Roles Authorization Module 421 will not find role B from the object 211 within the list of roles permitted access to Resource 1 (role "A" and "C"). As such, authorization of the access will fail and an error message will be sent as a response 403.

Figure 6:
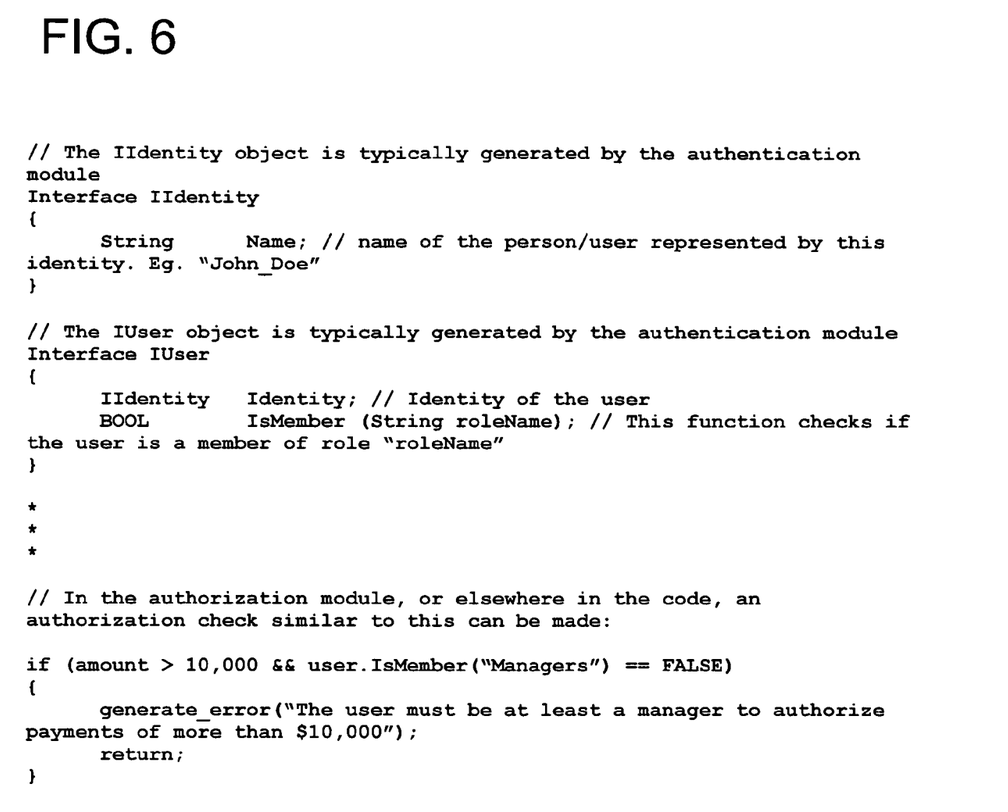
FIG. 6 illustrates sample software code used to implement an IUser object according to an example embodiment of the present invention.

FIG. 6 illustrates sample software code used to implement a IUser data object according to an example embodiment of the present invention. The software example consists of an interface IUser 601 which has an embedded object IIdentidy and a function "IsMember" which returns a Boolean value. The "IsMember" function determines whether this "IUser" object belongs to a given role or not. The name of the role (e.g. "Manager") is passed in as a parameter to this function. The embedded object "Identity", contains a "Name" property (string). This "Name" is typically the name of the user making the web request. E.g. "Name" could be "John_Doe".

When the server processes the request within the authorization module 421, test logic 602 may be employed to test whether the user is a member of a role identified as a "manager" and whether the "amount" of a value taken from the resource request is greater than 10,000. Any logic which may be expressed within the constructs of a programming language may be combined in this manner to generate a decision to grant or deny access to the resource.

Figure 7:
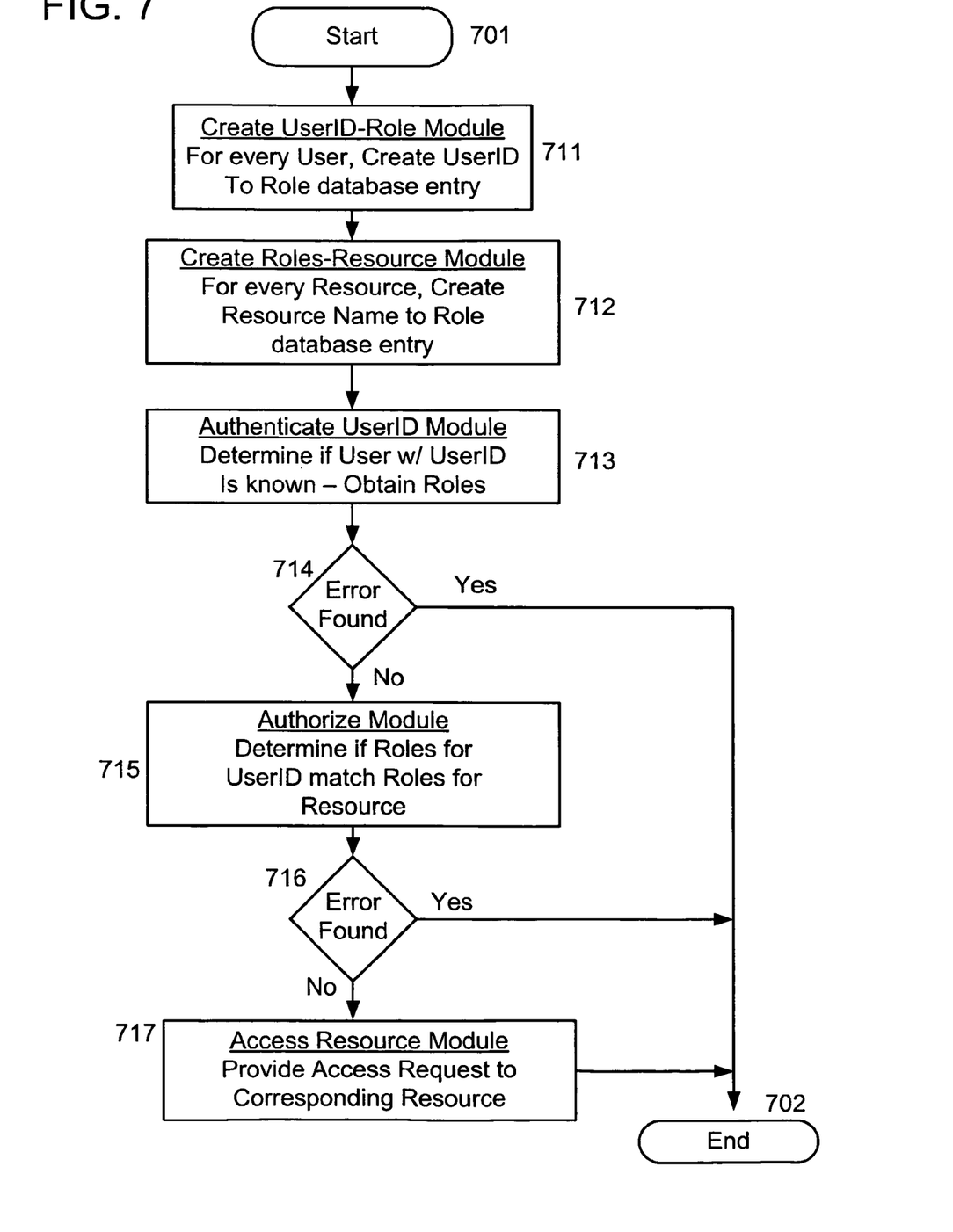
FIG. 7 illustrates an operation flow for a web server responding to a request for a web page using an authentication and authorization pipeline according to one possible embodiment of the present invention.

FIG. 7 illustrates an operation flow for a web server responding to a request for a web page using an authentication and authorization pipeline according to one possible embodiment of the present invention. The processing begins 701 with the execution of a Create UserID-Role Module 711. This module 711 declaratory creates the userID-roles entries within the UserID-Roles database 412 (see FIG. 4) within the authentication module 201. For every UserID that will be granted access to resources on this server, a corresponding entry will be created within this database 412.

Next, a Create Roles-Resource Module 712 declaratory creates the roles-resource entries within the Roles/Access database 422 within the authorization module 202. For every resource within the server, a corresponding entry will be created within this database 412. These two databases will now be used as described above to permit access to the resources on the server 102 (see FIG. 1).

A request to access to a resource will cause the authenticate userID module 713 to determine if the user is known and if so, to generate a userID-roles object 211. Test operation 714 will detect if the authentication was successful. If it is not successful, the processing ends at connector 702. If test operation 714 detects that the authentication was successful, an authorize module 715 will compare roles for the resource with roles for the userID. If there is a match, access is granted. Test operation 716 detects whether access was granted. If the authorization fails (i.e. access was not granted), the processing ends at connector 702. If the authorization is successful, access resource module 717 sends the resource access request to the corresponding resource for service.

Figure 8:
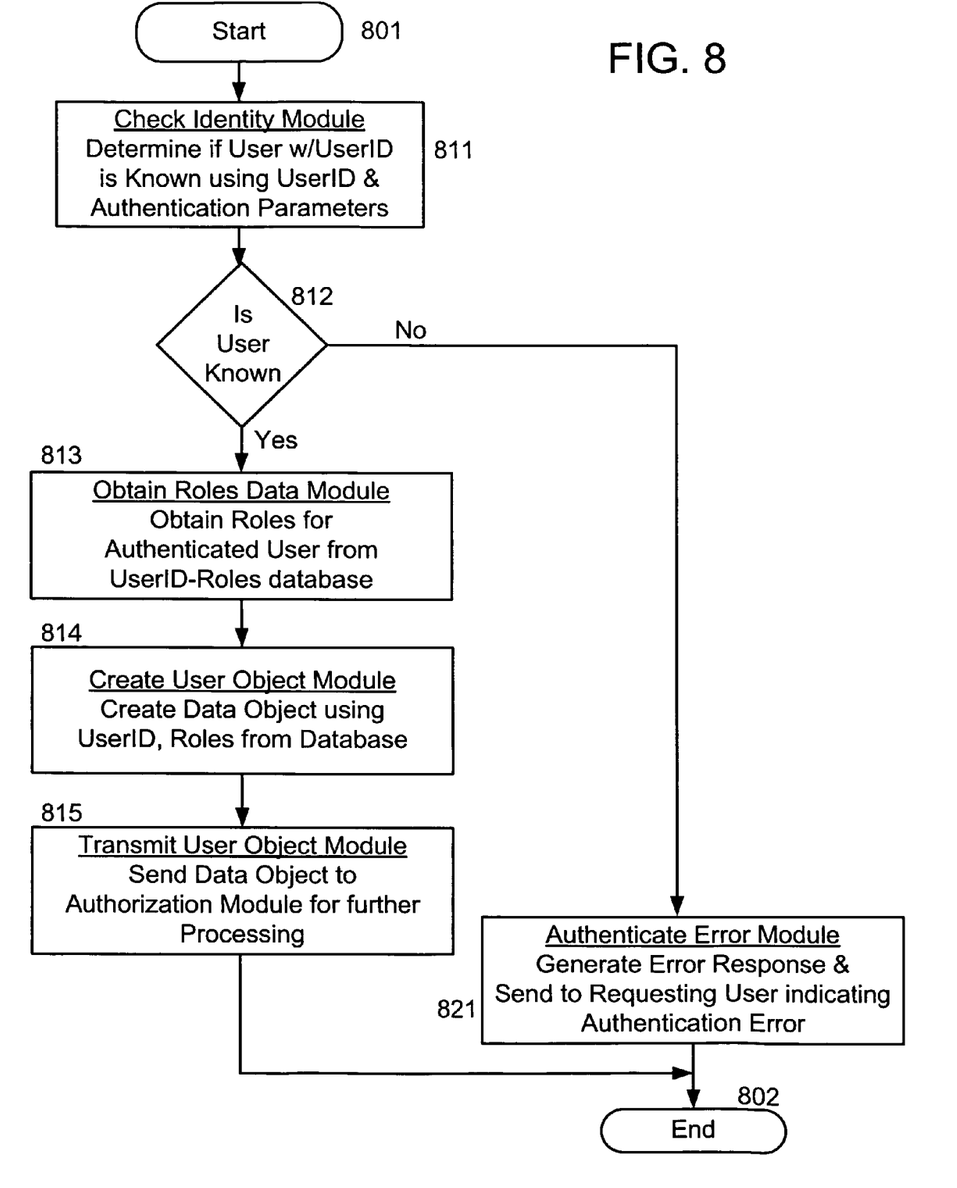
FIG. 8 illustrate an operation flow for an authentication module according to one possible embodiment of the present invention.

FIG. 8 illustrate an operation flow for an authentication module according to one embodiment of the present invention. When a service request 402 is received by the server 102, it is passed to the authentication module 411. Within the authentication module 411, a check identity module 811 is used to determine if the server knows the user. In one embodiment, this processing may be simply a comparison of a userID and a password to see if they match corresponding entries in a database. In other embodiments, more complex authentication mechanisms using digital signatures may be used. In all cases, the processing will generate the identical userID-roles object 211 such that a server may readily substitute various authentication modules for each other depending upon the level of assurance that is needed for a given resource access.

Test operation 812 will detect if the user sending the request for service is known. If not, processing will proceed to an Authentication error module in which an error response is generated and sent to the requesting user 103. If test operation 812 determines that the user is known, processing will proceed to Obtain Roles Data Module to obtain the roles data values corresponding to the authenticated userID from the userID-Roles database 412.

Next a Create IUser Object Module 814 will generate the userID-roles object 211 based upon the data received from the database 412. This data object 211 will be identical for all embodiments for the authentication module 411. The transmit IUser Object Module 815 sends the data object 211 to the authorization module 421 for further processing as all processing of the requests completes.

Figure 9:
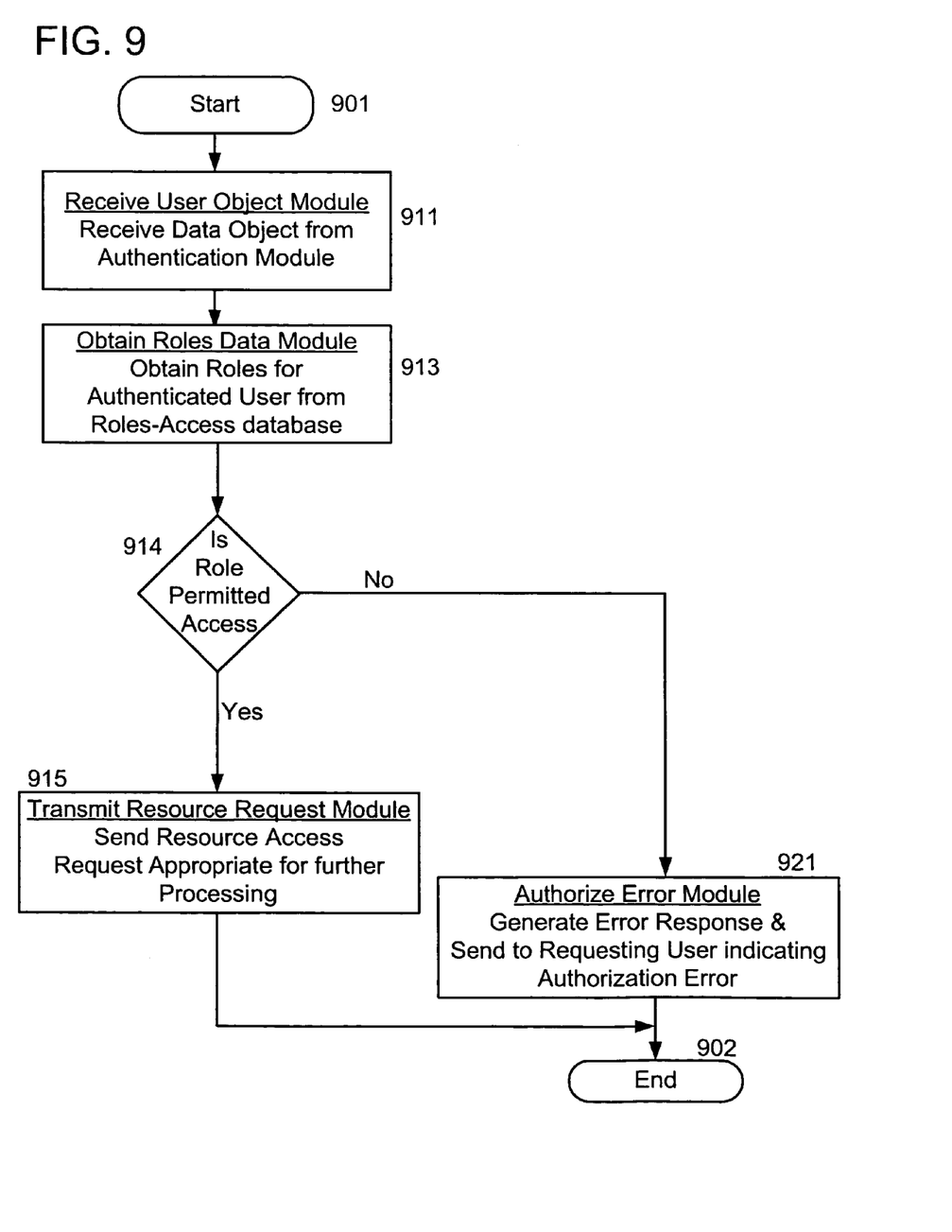
FIG. 9 illustrates an operation flow for an authorization module according to another possible embodiment of the present invention.

FIG. 9 illustrates an operation flow for an authorization module 421 according to another embodiment of the present invention. When the userID-roles object 211 is received by the authorization module 421, it is processed within a Receive IUser Object Module 911. Next, the operational flow proceeds to Obtain Roles Data Module 913. Module 913 obtains the roles data values corresponding to the requested resource from the Roles-resource database 422.

Test operation 914 will detects if any of the roles from the userID-roles object 211 corresponding to the authenticated userID match any of the known roles permitted access to the resource. If no match occurs, processing will proceed to an authorize error module 921 in which an error response is generated and sent to the requesting user 103. If a match does occur, a transmit resource request module 915 sends the resource access request 402 to the appropriate resource 501–503 for further processing. The corresponding resource will generate a response 403 to this request 402 that will ultimately be sent to the requesting user 103.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing an authentication and authorization pipeline in a web server having access to userID-roles data including a plurality of data entries for each user who may access resources present on the web server, and having access to resource-roles data including a plurality of data entries for each resource that may be accessed on the web server, the pipeline uses the userID-roles data and the resource-roles data to grant access to web resources to users, the method comprising:

receiving a plurality of resource access requests for a resource on the web server;
authenticating the identity of each user accessing the resource on the web server using a userID, and one or more authentication parameters;
for each of the resource access requests by each user, creating a distinct data object having an authenticated userID and one or more roles corresponding to the authenticated userID obtained from the userID-roles data; and
authorizing access to a resource identified within one of the resource access requests if one or more access roles contained within the data object correspond to the resource roles listed within the resource-roles data for the identified resource, where, in pipeline fashion, the data object is passed from the operation authenticating the identity of each user and the data object is received by the operation authorizing access to the resource.

2. The method according to claim 1, wherein the method further comprises passing the resource access request to the identified resource for servicing.

3. The method according to claim 1, wherein authenticating the identity of each user further comprises generating a response to the resource access request indicating an authentication error when the identity of the user cannot be successfully authenticated.

4. The method according to claim 1, wherein authorizing access to a resource further comprises generating a response to the resource access request indicating an authorization error when access to the resource may not be provided to the authenticated userID.

5. The method according to claim 4, wherein authenticating the identity of each user operation is performed within a separate operation from the authorizing access to a resource operation.

6. The method according to claim 5, wherein the data object is passed between the operation authenticating the identity of each user operation to the operation authorizing access to a resource operation.

7. The method according to claim 1, wherein the authentication parameters include one or more of the following: a password, a digital signature, a digital certificate obtained from a source trusted by the server, and a public key encrypted message.

8. The method according to claim 1, wherein the web resource being accessed includes a web page.

9. The method according to claim 1, wherein the web resource being accessed includes a data file located on the web server.

10. The method according to claim 1, wherein the web resource being accessed includes an executable software module.

11. A method for providing an authentication and authorization pipeline having a userID-roles database and a resource-roles database for use in a web server to grant access to web resources to users, the method comprising:
   creating an entry within the userID-roles database for each user who may access resources present on the web server;
   creating an entry within the resource-roles database for each resource that may be accessed on the web server;
   receiving a plurality of resource access requests for one of the resources on the web server;
   authenticating the identity of each user accessing a resource on the web server using a userID, and one or more authentication parameters;
   for each of the resource access requests by each user, creating a distinct data object having an authenticated userID and one or more roles corresponding to the authenticated userID obtained from the userID-roles database; and
   authorizing access to a resource identified within one of the resource access request if one or more roles contained within the corresponding data object correspond to an access role corresponding to the roles listed within the resource-roles database for the identified resource;
   wherein authenticating the identity of each user operation is performed within a separate operation from the authorizing access to a resource operation; and
   in pipeline fashion, the data object is passed from the operation authenticating the identity of each user and is received by the operation authorizing access to a resource.

12. A computer data product readable by a computing system and encoding a set of computer instructions for providing an authentication and authorization pipeline having a userID-roles database and a resource-roles database for use in a web server to grant access to web resources to users, comprising:
   receiving a plurality of resource access requests for at least one resource on the web server;
   authenticating the identity of each user accessing the at least one resource on the web server using a userID, and one or more authentication parameters;
   for each of the resource access requests by each user, creating a distinct data object having an authenticated userID and one or more roles corresponding to the authenticated userID obtained from the userID-roles database; and
   authorizing access to a resource identified within one of the resource access requests if one or more roles within the corresponding data object correspond to an access role corresponding to the roles listed within the resource-roles database for the identified resource, where, in pipeline fashion, the data object is passed from the operation authenticating the identity of each user and the data object is received by the operation authorizing access to the resource.

13. The computer data product according to claim 12, wherein the method further comprises:
   creating an entry within the userID-roles database for each user who may access resources present on the web server;
   creating an entry within the resource-roles database for each resource that may be accessed on the web server; and
   passing the resource access request to the identified resource for servicing.

14. The computer data product according to claim 12, wherein authenticating the identity of each user further comprises generating a response to the resource access request indicating an authentication error when the identity of the user cannot be successfully authenticated.

15. The computer data product according to claim 12, wherein authorizing access to a resource further comprises generating a response to the resource access request indicating an authorization error when access to the resource may not be provided to the authenticated.

16. The computer data product according to claim 15, wherein authenticating the identity of each user operation is performed within a separate operation from the authorizing access to a resource operation.

17. The computer data product according to claim 16, wherein the data object is passed between the operation authenticating the identity of each user operation to the operation authorizing access to a resource operation.

18. The computer data product according to claim 12, wherein the authentication parameters include one or more of the following: a password, a digital signature, a digital certificate obtained from a source trusted by the server, and a public key encrypted message.

19. The computer data product according to claim 12, wherein the web resource being accessed includes a web page.

20. The computer data product according to claim 12, wherein the web resource being accessed includes a data file located on the web server.

21. The computer data product according to claim 12, wherein the web resource being accessed includes an executable software module.

22. A system for providing an authentication and authorization pipeline having a userID-roles database and a resource-roles database for use in a web server to grant access to web resources to users, comprising:
   a plurality of resource access requests from at least one user for at least one resource on the web server;

an authentication module for verifying the identity of the user sending each of the resource access requests using a userID, and one or more authentication parameters;

an authorization module for determining whether the user is granted access to the requested resource; and wherein for each of the resource access requests by each user, the authentication module creates a distinct data object having an authenticated userID and one or more roles corresponding to the authenticated userID obtained from the userID-roles database, where, in pipeline fashion, said authentication module passing the data objects and the authorization module receiving the data objects for use in determining whether to grant access to the requested resource.

23. The system according to claim 22, wherein the authorization module authorizes access to the resource identified within the resource access request if one or more roles within the data object correspond to an access role corresponding to the roles listed within the resource-roles database for the identified resource.

24. The system according to claim 23, wherein the authentication parameters include one or more of the following: a password, a digital signature, a digital certificate obtained from a source trusted by the server, and a public key encrypted message.

25. The system according to claim 23, wherein the web resource being accessed includes a web page.

26. The system according to claim 23, wherein the web resource being accessed includes a data file located on the web server.

27. The system according to claim 23, wherein the web resource being accessed includes an executable software module.

28. A web server for providing a response to an HTTP request for access to at least one resource available to the web server comprising:

a plurality of processing modules interconnected in a pipelined fashion to form an HTTP pipeline that performs various tasks on the HTTP request prior to passing the HTTP request onto a content storage and retrieval module, the plurality of processing modules comprising:

a replaceable authentication module adapted to receive a user identifier and at least one additional authentication parameter and further adapted to create a data object containing the user identifier and at least one role a user associated with the identifier is allowed to perform; and an authorization module adapted to receive the object and determine whether the user associated with the identifier is authorized to access the at least one resource requested in the HTTP request; and wherein a content and retrieval module is adapted to receive the HTTP request if the authorization module determines that the user is authorized to access at least one resource and adapted to formulate a response containing at least one resource, where, in pipeline fashion, the data object is passed from the replaceable authentication module and the data object is received by the authorization module.

29. A web server for providing a response to an HTTP request for access to at least one resource available to the web server comprising:

a plurality of processing modules interconnected in a pipelined fashion to form an HTTP pipeline that performs various tasks on the HTTP request prior to passing the HTTP request onto a content storage and retrieval module, the plurality of processing modules comprising:

a replaceable authentication module adapted to receive a user identifier and at least one additional authentication parameter and further adapted to creates and pass in pipeline fashion, an object containing the user identifier and at least one role a user associated with the identifier is allowed to perform; and an authorization module adapted to receive in pipeline fashion the object and determine whether the user associated with the identifier is authorized to access the at least one resource requested in the HTTP request; and the content storage and retrieval module is adapted to receive the HTTP request if the authorization module determines that the user is authorized to access the at least one resource and adapted to formulate a response containing the at least one resource.

30. The web server of claim 29 further comprising an authenticate error module adapted to generate error responses if the user identifier is unknown.

31. The web server of claim 29 further comprising an authorize error module adapted to generate error responses if the user associated with the identifier is not authorized to access the at least one resource requested in the HTTP request.

32. The web server of claim 29 wherein the replaceable authentication module is at least one of either third-party modules, enhoused modules, extended modules, and custom developed modules that provide a desired level of security for the web server.

33. The web server of claim 29 wherein the replaceable authentication module is interchangeable with another replaceable authentication module without affecting functionality and operation of other modules.

34. A web server for providing a response to an HTTP request for access to at least one resource available to the web server comprising:

a plurality of processing modules interconnected in a pipelined fashion to form an HTTP pipeline that performs various tasks on the HTTP request prior to passing the HTTP request onto a content storage and retrieval module, the plurality of processing modules comprising:

at least two different authentication modules, each of the at least two different authentication modules adapted to receive a user identifier and at least one additional authentication parameter and further adapted to create, and pass in pipeline fashion, an object containing the user identifier and at least one role a user associated with the identifier is allowed to perform; and at least two different authorization modules, each of the at least two different authorization modules adapted to receive, in pipeline fashion, the object and determine whether the user associated with the identifier is authorized to access the at least one resource requested in the HTTP request; and the content storage and retrieval module adapted to receive the HTTP request if the authorization module determines that the user is authorized to access the at least one resource and adapted to formulate a response containing the at least one resource.

35. A computer data product readable by a computing system and encoding a set of computer instructions for providing access to resources on a web server to users using a pipeline having a userID-roles database with an entry for each user who may access the resources and a resource-roles database with an entry for each of the resources that may be accessed by the user, comprising:

authenticating the identity of each user accessing a resource on the web server using a userID, and one or more authentication parameters;

creating a data object corresponding to each resource access request, said data object having an authenticated userID and one or more roles corresponding to the authenticated userID obtained from the userID-roles database; and     authorizing access to a resource identified within one of the resource access requests if one or more access roles contained within the data object correspond to the resource roles listed within the resource-roles data for the identified resource;

wherein authenticating the identity of each user operation is performed within a separate operation from the authorizing access to a resource; and the data object is passed from the operation authenticating the identity of each user operation and is received by the operation authorizing access to a resource.

\* \* \* \* \*